JOHNSON & DAVIES.
Baker's Oven.
No. 34,502.
Patented Feb. 25, 1862.
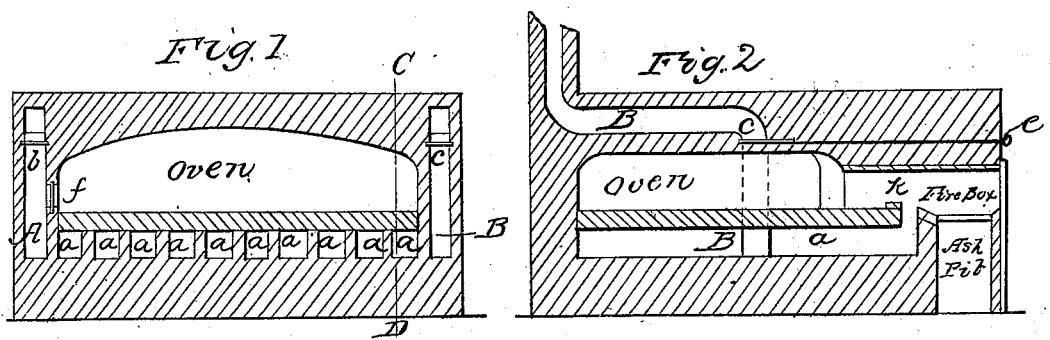
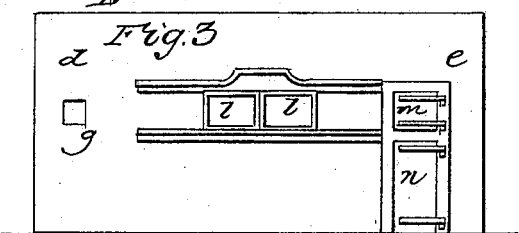
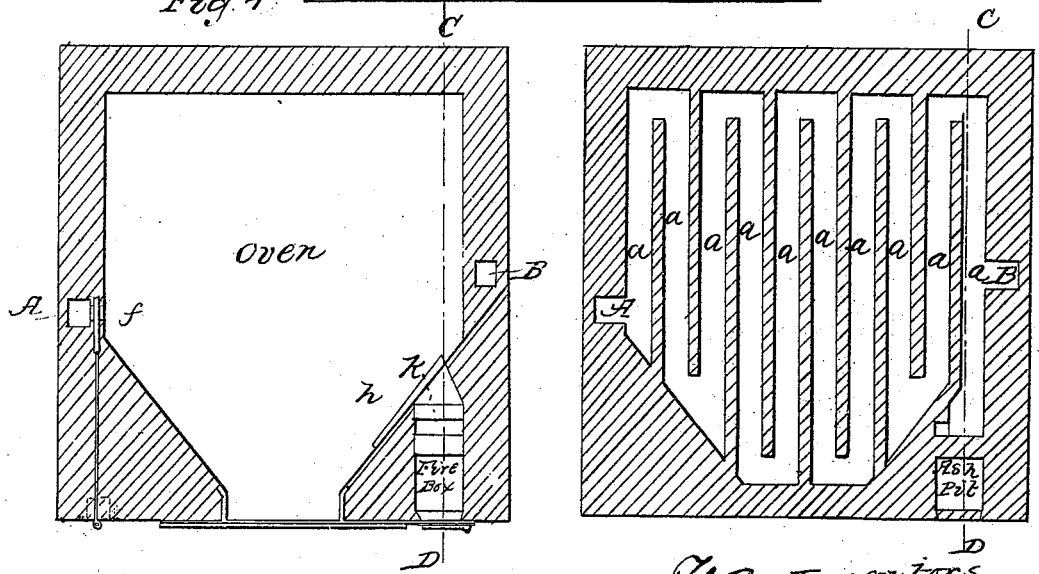
Witnesses
Allize Hill
John Jaggard
Inventors
William Johnson
Henry Davies

UNITED STATES PATENT OFFICE.

WILLIAM JOHNSON AND HENRY DAVIES, OF BROOKLYN, NEW YORK.

IMPROVEMENT IN BAKERS' OVENS.

Specification forming part of Letters Patent No. 34,502, dated February 25, 1862.

*To all whom it may concern:*

Be it known that we, WILLIAM JOHNSON and HENRY DAVIES, both of the city of Brooklyn, in the county of Kings, State of New York, have invented certain new and useful Improvements in Bakers' Ovens; and we do hereby declare that the following is a full and exact description thereof, reference being had to the accompanying sheet of drawings, and to the letters of reference marked thereon.

Figure 1 is a vertical transverse section. Fig. 2 is a vertical longitudinal section on the line C D. Fig. 3 is a front elevation. Fig. 4 is a ground plan of the oven-bottom. Fig. 5 is a horizontal section through the flues beneath the bottom of the oven.

In all the figures like letters of reference refer to like parts.

The ordinary bakers' ovens have been made with a fire at or near the level of the bottom of the oven, and the heat itself led through the oven. In other instances the fire heat has been excluded from the oven itself and led through flues above or below the oven, or both above and below the oven.

The nature of our said invention consists in the employment, with an ordinary oven and fire-place, of flues beneath the oven in connection with dampers so arranged and applied, as hereinafter set forth, that the heat may be passed directly from the fire through the oven, as in the ordinary baker's oven, or else through the flues beneath the oven, and then passed away by the chimney, or else the heat may be passed directly through the oven and returned by the flues below the oven, to a second chimney or flue. Thus the heat is entirely under control, and the ordinary baker's oven, capable of baking bread by the heat passing through the same, is made capable of baking crackers and similar articles by the heat beneath the bottom of the oven; or the entire oven is more uniformly heated by allowing the heat to pass through the oven and act on the crown, and then return beneath the bottom and heat that. Thus we are able to adapt the oven to different kinds of baking or regulate the application of the heat as circumstances may require.

To enable others skilled in the art to make and use our invention, we will proceed to describe its use construction and operation.

We construct our oven of brick and cement similar to those now in use for baking crackers, with horizontal flues beneath the bottom and upright flues at the sides, with fire-box, ash-pit, doors, dampers, and other appendages of such ovens; but in order to apply heat to the oven while the operation of baking is being performed, and thereby avoid the loss of time for reheating between each charge, we provide the damper $h$ for closing the communication between the fire-box and oven, and also make the opening $i$ between the said damper and the fire-box to the flues beneath, through which any desired amount of heat may be supplied. We apply the damper $f$ for closing the opening from the oven to the flue A when the oven is charged, to prevent the escape of the vapor arising from the articles while baking. We apply the damper $k$ for closing the opening $i$ when required.

The operation of our improved oven is as follows: To direct the heat through the flues beneath the bottom of the oven to the upright flue A, we close the dampers $f$, $h$, and $c$ and open the dampers $k$ and $b$. To direct the heat through the oven to the flue A, and then through the flues beneath the bottom to the upright flue B, we close the dampers $k$ and $b$ and open the dampers $h$, $f$, and $c$. To direct the heat through the oven only to the upright flue A, we close the dampers $k$ and $c$ and open the dampers $h$, $f$, and $b$.

By closing the dampers $h$, $b$, and $f$ and opening the dampers $k$ and $c$ the heat may be conveyed away without acting preceptibly on the oven in case the oven becomes too hot.

What we claim, and desire to secure by Letters Patent, is—

The application to an ordinary baker's oven, wherein the fire heat can pass directly into and through the oven, of the flues $a\,a$, A, and B, and dampers $h$, $k$, $f$, $b$, and $c$, arranged in the manner and for the purposes set forth.

WILLIAM JOHNSON.
HENRY DAVIES.

Witnesses:
AMZI HILL,
JOHN JAGGARD.